United States Patent [19]
Vogel

[11] 3,811,420
[45] May 21, 1974

[54] IGNITION SYSTEM FROM AN INTERNAL COMBUSTION ENGINE

[75] Inventor: Wilhelm Vogel, Stuttgart, Germany

[73] Assignee: Robert Bosch GmbH, Stuttgart, Germany

[22] Filed: Jan. 14, 1972

[21] Appl. No.: 217,779

[30] Foreign Application Priority Data
Jan. 21, 1971 Germany............................ 2102688

[52] U.S. Cl. .... 123/148 E, 123/117 R, 123/146.5 A
[51] Int. Cl............................................... F02p 5/02
[58] Field of Search ...... 123/148 E, 146.5 A, 117 R

[56] References Cited
UNITED STATES PATENTS

| | | | |
|---|---|---|---|
| 3,660,689 | 5/1972 | Oishi............................ | 123/148 E |
| 3,202,146 | 8/1965 | Short............................ | 123/148 E |
| 3,314,407 | 4/1967 | Schneider..................... | 123/148 E |
| 3,592,178 | 7/1971 | Schiff........................... | 123/117 R |
| 3,636,931 | 1/1972 | Suda............................. | 123/32 EA |

Primary Examiner—Laurence M. Goodridge
Assistant Examiner—Cort Flint
Attorney, Agent, or Firm—Michael S. Striker

[57] ABSTRACT

An ignition system regulates the ignition timing of a combustion engine by first generating a series of pulses in synchronism with the position of the rotating crankshaft which are utilized to trigger a monostable multivibrator to generate a series of uniform pulses. The average value of these uniform pulses is obtained by passing these through low pass filters and utilized to drive a constant DC current source which charges a storage capacitor to form part of a saw-tooth generator. The resulting slopes of the leading edges thus formed are a function of the crankshaft rotation speed. An independent set of impulses, also synchronously timed with the position of rotation of the crankshaft, is used to discharge the storage capacitor. The saw-tooth wave-form is applied to a Schmidt-trigger which is adjusted to sense a predetermined level of the leading edges. When the leading edge reaches this threshold value, the Schmidt-trigger activates an amplifier which transmits a control signal to the ignition coil of the combustion engine to ignite the combustible mixture in the cylinders. By regulating the level of the saw-tooth wave-form as a function of the rotational speed of the crankshaft and the intake manifold pressure, the ignition timing can be regulated in response to changes in these parameters.

11 Claims, 6 Drawing Figures

IGNITION SYSTEM FROM AN INTERNAL COMBUSTION ENGINE

BACKGROUND OF THE INVENTION

The present invention relates to ignition systems, and in particular an electronic ignition system for regulating the ignition timing both as a function of the speed of the crankshaft as well as the pressure in the intake manifold.

Ignition systems are well known which can regulate the ignition timing or the spark-advance for an engine as a function of both the speed of the engine as well as the pressure in the intake manifold. Namely, there are two general types of spark-advance mechanisms, centrifugal and vacuum. These mechanisms vary the spark timing for different engine-operating conditions. The most common mechanisms used for this purpose have been mechanical ones. To provide this advance, a centrifugal advance mechanism is used. It essentially consists of two weights that throw out against spring tension as the engine speed increases. This movement is transmitted through a toggle arrangement to the breaker cam. This causes the cam to advance or move ahead, with respect to the distributor drive shaft. The timing of the spark of the cylinder consequently varies from no advance at low speeds to full advance at high speeds when the weights have reached the outer limits of their travel. The amount of advance is measured in degrees of crankshaft rotation before the piston reaches top dead center.

On the other hand the spark advance must also be compensated for with respect to changes in the intake manifold pressure. Thus, on the part throttle a partial vacuum develops in the intake manifold. This means that less air and fuel will be admitted to the cylinder. Thus, the mixture will be less highly compressed. The resulting mixture will burn more slowly when ignited, and, in order to realize full power from it, the sparks should be sufficiently advanced. To secure this advance of the spark, the vacuum-advance mechanism is used. This type of advance generally contains a spring-loaded and air-tight diaphragm connected by a linkage, or level, to a breaker plate which is supported on a bearing so that it can turn with respect to the distributor housing. When the throttle is opened, the intake manifold pressure can then draw air from the vacuum line and the air-tight chamber in the vacuum-advance mechanism. This causes the diaphragm to move against the spring. This movement carries the contact points around so that the cam, as it rotates, closes and opens the points earlier in the cycle. The spark consequently appears at the spark-plug gap earlier in the compression stroke. As the throttle is opened wider, there will be less vacuum in the intake manifold and less vacuum advance. At wide opened throttle there will be no vacuum advance at all. The spark advance under this condition will be provided entirely by the centrifugal advance mechanism.

The above-described prior art ignition systems have had disadvantages. For one, the movable parts in such systems have been subject to wear, and thus have generally required periodic maintenance. For this reason, such systems have not always been reliable.

Consequently, attempts have been made to replace the mechanical ignition systems with electronic ignition systems. Such electronic systems are known which attempt to duplicate the ignition characteristics of the mechanical systems. However, the known electronic systems have not been able to exactly reproduce the ignition characteristics which render optimum engine performance. In the mechanical systems, a complicated cam is required to provide such performance. The electronic ignition systems known in the prior art which reproduce such characteristics both as a function of speed and intake manifold pressure have generally been considerably complex and thus expensive to implement.

More specifically, it is required of such ignition systems that the firing point in the region of low engine speeds vary proportional to the speed. However, over a boundary speed of approximately 70 percent of the maximum engine speed the ignition, or pre-ignition, remain constant in relation to the position of the crankshaft. However, as described above, the intake manifold pressure or partial vacuum must also be taken into account for proper pre-ignition. In the region of approximately 100 to 300 mm Hg the ignition timing should be advanced substantially linearly as a function of such pressure. These changes in pressure, which are a function of the throttle opening, therefore require advance above that which may be required by changes in the engine speed.

The main difficulty in trying to talior the ignition characteristic is that at partial throttle opening, that is by high intake manifold suction, the pre-adjustment at lower speeds as well as at speeds above a speed which is approximately 75 percent of the maximum speed, it is desired that the ignition curve is not influenced by the intake manifold pressures. Thus, the ignition curve as a function of the speed at partial throttle exhibits discontinuities which can only be reproduced electrically by use of very complex circuitry.

One attempt to thus reproduce the ignition curve with the discontinuities just described, involved the use of a timing element which had a plurality of time constants to simulate the ignition characteristic line at full load or full throttle opening. The partial pressure in the exhaust manifold was taken into account by providing in the circuitry of the timing element a very variable resistance whose resistance varies as a function of the exhaust manifold pressure. This variable resistance formed part of the timing circuit, thus permitting changes in the ignition timing as a function of the intake manifold pressure. In such an arrangement, it is only possible to consider the intake manifold pressure as a multiplication factor, the reduction in the ignition timing at a higher speed at partial throttle is neglected. As a result, at higher speeds, greater deviation in the desired firing times are obtained and consequently higher fuel consumption has resulted.

SUMMARY OF THE INVENTION

Accordingly, it is an object of the present invention to provide an ignition system for internal combustion engines which does not have the disadvantages of the prior art systems.

It is another object of the present invention to provide an ignition system for internal combustion engines which is simple in construction and economic to manufacture and which regulates the timing by the use of electronic circuitry.

It is still another object of the present invention to provide an ignition system for internal combustion engines which consists of a relatively simple electric circuit and which reproduces the desired ignition timing characteristic curve at high speeds and considers exactly the conditions of the pressure in the intake manifold to adjust the ignition timing in dependence thereon without the necessity of utilizing complicated timing elements which have a plurality of time constants.

It is a further object of the present invention to provide an ignition system for internal combustion engines which is simple in construction and consists of an electrical circuit which can be easily adjusted for adaptation for varied combustion engines regardless of their ignition requirements.

According to the present invention, in an ignition system for an internal combustion engine wherein a crankshaft is rotatable at a plurality of speeds, control means are provided for adjusting the timing of ignition of a combustible fuel mixture in the cylinder means of said engine. Said control means comprises generating means and detecting means. The generating means is utilized for generating saw-tooth pulses having leading edges. The slope of said leading edges and the frequency of said pulses are functions of the speed of said crankshaft. Said leading edges fluctuate between first and second levels. The detecting means is utilized for detecting said leading edges and are sensitive to a predetermined level thereof, which is intermediate to said first and second levels. Said generating means generates control signals in response to said leading edges reaching said predetermined level for effecting ignition of the combustible mixture in said cylinder means.

According to a presently preferred embodiment, said generating means comprises a saw-tooth generator which has a storage capacitor and a constant current means for slowly charging said storage capacitor and switching means for rapidly discharging said capacitor. Said generating means further comprises electrical impulse generator means for generating impulses in synchronization with the position of said crankshaft. A monostable multivibrator is provided for generating uniform pulses in response to the generation of said impulses by said impulse generator means. Low pass filters are provided for passing the low freguency components of said uniform pulses. The constant current means is influenced by the low frequency components for regulating the magnitude of the constant current which charges said storage capacitor. Said generating means also comprises a further electrical impulse generating means for generating impulses in synchronization with the position of the crankshaft, each of the latter impulses being generated after ignition has been effected in said cylinder means. Said switching means is responsive to said impulses for discharging said storage capacitor. Said generating means further comprises an inverting amplifier provided between said low pass filter and said saw-tooth generator, said inverting amplifier having first and second elements. The DC voltage level at said first output increases with increasing speed, the DC voltage level at said second output decreases with increasing speed. Said saw-tooth generator is connected to said first output of said inverting amplifier.

Said detecting means comprises a threshold circuit arranged to detect said predetermined level. A summing device having a plurality of inputs and at least one output is provided, said output being connected to said threshold circuit and one input of the summing device being connected to said saw-tooth generator. Another input of said summing device is connected to said second output of said inverting amplifier. Said detecting means further comprises a limiting stage provided between said output of said inverting amplifier and said summing device input. In this manner, the level of the saw-tooth wave-form is shifted in relation to the predetermined threshold value of the threshold circuit. Such relative shifting provides the changes in relative ignition time as a function of speed of the crankshaft.

Said detecting means further comprising a pressure transducer means for sensing the intake manifold pressure. The latter means is connected to a third input of said summing device. Said pressure transducer means comprises an oscillator having inductive feedback coupling. A damping element mechanically activated by the position of the engine throttle is utilized for modifying said coupling. A stage is provided between said pressure transducer means and said summing device. In this manner, the level of the saw-tooth wave-form can again be shifted relative to the threshold predetermined value, but now as a function of the intake manifold pressure. By utilizing limiting circuits for both the speed as well as the intake manifold pressure, the ignition timing characteristic curve, together with the desired discontinuities therein, can be simulated by the use of the electrical circuit forming the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED
EMBODIMENTS

Figure 1:
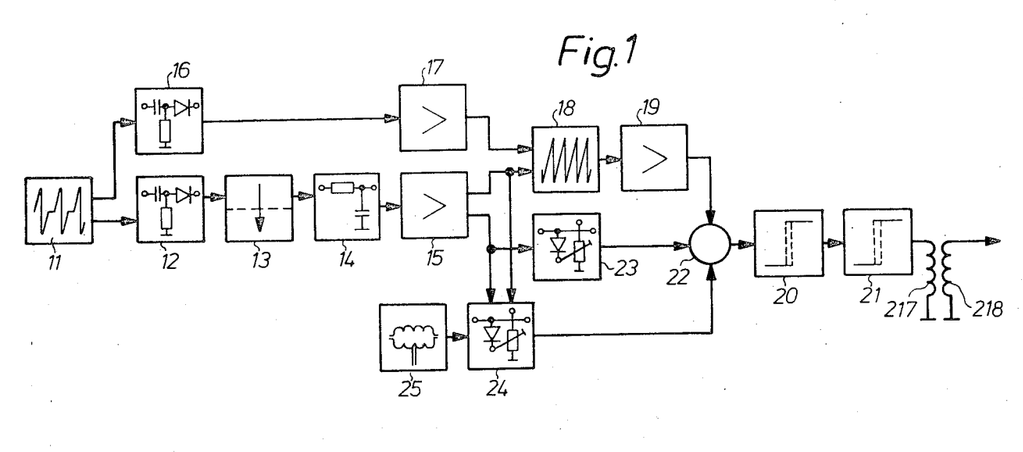
FIG. 1 is a block diagram of an ignition system in accordance with the present invention.

Referring to FIG. 1, the ignition system is shown to have an impulse generator 11. The impulse generator 11 has two outputs, one output feeding a respective parallel branch. The first branch series of blocks are connected. Thus, the impulse generator 11 feeds a differentiating element 12, a monostable multivibrator stage 13, a low pass filter 14, and an inverting amplifier 15. The other branch, of the impulse generator 11, feeds differentiating element 16 and a discharging stage 17.

The inverting amplifier 15 has two outputs, one of which is connected to a saw-tooth generator 18. Also feeding the saw-tooth generator 18 is the discharging stage 17. The output of the saw-tooth generator is connected with an impedance transformer 19. The output of the impedance transformer 19 is connected to one of the inputs of a summing device 22. The output of the summing device 22 is connected to a threshold circuit 20, whose output is connected to switching amplifier 21.

The outputs of the inverting amplifier 15 are also connected to two limiting stages 23, and 24. The output of the limiting stage 23 is connected to another input of the summing device 22 serving as an adjustment signal input means. The limiting stage 24 has another input which is connected to a pressure-transducer 25. The output of the limiting stage 24 is connected to a third input of the summing device 22. The functions of the various blocks just described will be described hereafter.

Figure 1A:
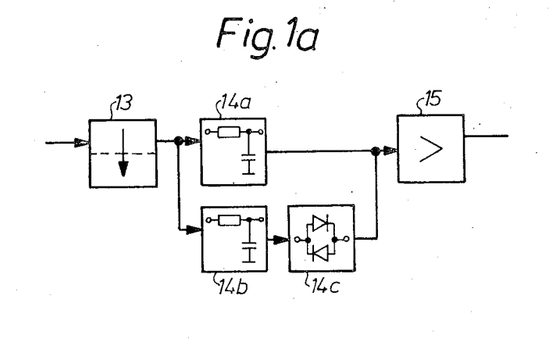
FIG. 1a shows a modification in one of the blocks shown in FIG. 1.

Referring now to FIG. 1a, this shows a modification of one of the blocks which are shown in FIG. 1, namely the low pass filter 14. The monostable multivibrator 13 and the inverting amplifier 15 are the same here as those shown in FIG. 1. However, the filter block 14 has now been replaced by two low pass filters 14a and 14b. In addition, the outputs of the two low pass filters have been connected by an equalizing element 14c. With such an arrangements the two low pass filters 14a and 14b are selected to have different cut-off frequencies. In a presently preferred embodiment, the first low pass filter 14a has a lower cut-off frequency than that of the second low pass filter 14b. The two inputs of the low pass filters are connected with one another so that the signals being transmitted by the monostable multivibrator 13 are supplied to each of the filters simultaneously.

Figure 2:
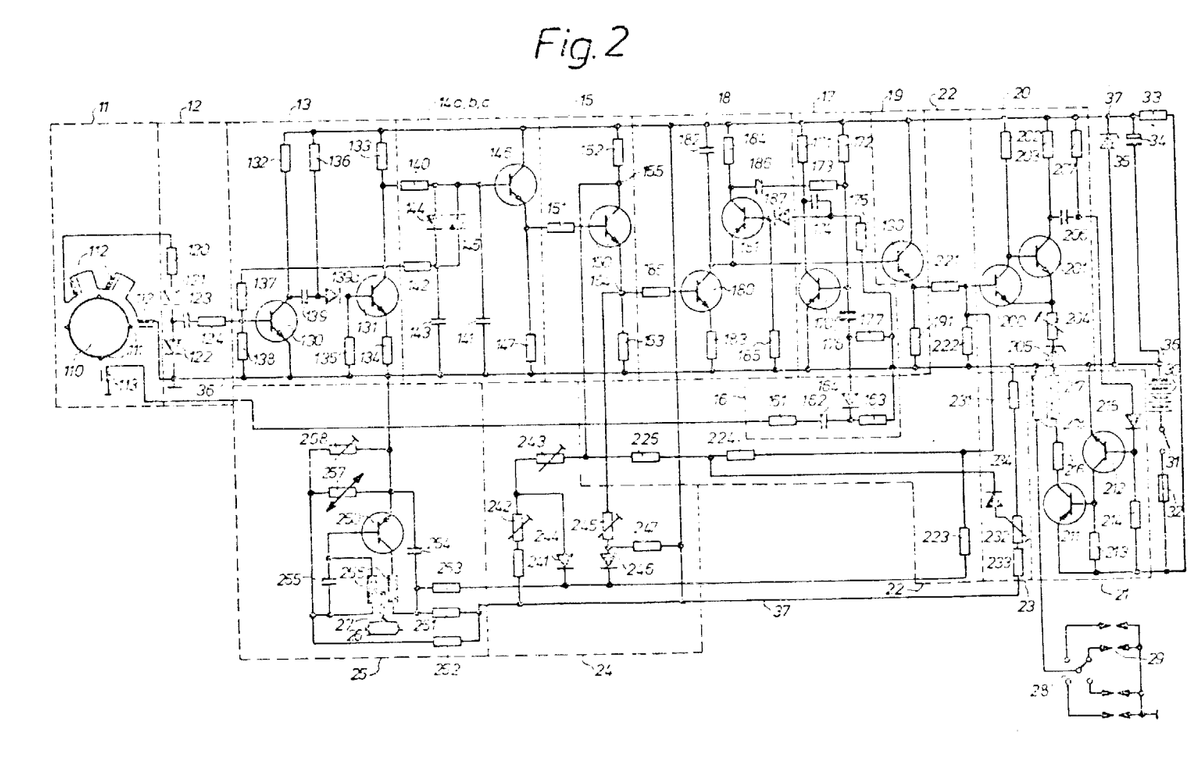
FIG. 2 is a schematic diagram of the embodiment illustrated in FIG. 1.

Referring now to FIG. 2 this illustrates an exact schematic of the presently preferred embodiment, shown in the block diagram of FIG. 1, including the modification according to FIG. 1a. The electric impulse generator 11 includes a disk 110, which may be mounted on the rotating crankshaft. The disk is divided into four equal sectors, as shown. Four teeth 111 are uniformly distributed about the periphery of the disk 110. According to the presently preferred embodiment, the teeth 111 are made from a permanent magnetic material. The disk just described corresponds to four cylinder combustion engines. For arrangements having a different number of cylinders, a different number of teeth, corresponding to the number of cylinders, must be utilized. The permanent magnetic teeth 111 rotate in response to the rotation of the crankshaft about the axis of the latter. Series connected first induction or pickup coils 112 are positioned along the periphery of the disk 110 so that the teeth 111 successively pass adjacent each one of the pickup coils. The pickup coils 112 are connected to each other as shown and are distributed about the disk 110 at angles approximating 60° from one another. A second induction or pickup coil 113 is similarly positioned adjacent to the periphery of the disk 110 and the teeth 111 successively passed in the region of said latter pickup coil. The three pickup coils 112 are connected in series, one of said coils being connected to the circuit ground. Likewise, one end of the pickup coil 113 is connected to the circuit ground. When the teeth 111 pass the pickup coils, a voltage is induced in said pickup coils in accordance with well known magnetic principles. Thus, for each revolution of the disk 110, twelve induced signals will be generated in the three pickup coils 112 while only four induced signals will be generated in the pickup coil 113. In the instance when the disk 110 rotates at a uniformly constant rotational velocity, it is clear that the frequency at the output of the series-connected pickup coils 112 will be equal to three times the frequency formed at the output of the pickup coil 113.

Thus, as described in connection with FIG. 1, the impulse generator 11 has two outputs, namely one output from the series-connected coil 112 and another output from the individual pickup coil 113. The output from the series connected coils 112 is connected to a differentiating circuit 12. This latter circuit includes a resistance 120 and two diodes 121 and 122 connected in series between the series connected output coils 112 and the circuit ground. At the junction point between the two diodes 121 and 122 is connected a differentiating capacitor which is followed by a resistance 124.

Monostable multivibrator 13 includes two transistors 130, 131 which are connected in a well known way. In the collector circuit of the transistor 130 is provided a collector resistance 132 while in the collector resistance of the transistor 131 is provided a collector resistance 133. The collector of the second transistor 131 is directly coupled to the base of the first transistor 130 over a resistance 137. The collector of the first transistor 130, however, is capacitively coupled to the base of the second transistor 131 over a series connected circuit comprising a capacitor 139 and a diode 139a. A resistance 135 is connected between the base of the second transistor 131 and the circuit ground. Connected between the capacitor 139 and the diode 139a is a resistance 136 which is connected to the positive supply voltage lead 37. The base of the first transistor 130 is connected with the resistance 124 and is also connected to circuit ground through a resistance 138.

The low pass filter arrangement 14 suggested in FIG. 1 is replaced, as described above, by the blocks 14a, 14b and 14c as shown in FIG. 1a. This arrangement generally comprises two RC elements. These elements include the resistances 140 and 142 and the corresponding capacitors 141 and 143. These low pass filters each operate as a separate low pass filter. The first low pass filter consists of the resistance 140 and the capacitor 141 and has the lower cut-off frequency of the two filters. The second low pass filter, comprising the resistance 142 and capacitor 143 has the higher cut-off frequency. The inputs to the low pass filters, namely the left-handed leads of the resistances 140 and 142 are each connected to the collector of the transistor 131. In this manner, the signals appearing at the collector of the latter transistor are supplied to each of the low pass filters simultaneously. Connected at the outputs of each of the low pass filters, namely at the right hand leads of the resistances 140, 142 is an equalizing element denoted by the reference numeral 14a in FIG. 1a which comprises of back-to-back diodes which are connected to each other and to each of the resistances 140 and 142. The output of the first low pass filters is connected to the base of the transistor 146. This latter transistor has an emitter resistance 147 and functions as an emitter follower for the purpose of transforming the impedance between the low pass filters and the stage following.

At the output of the low pass filter stages, is an inverting amplifier 15 which consists of a transistor 150 having a base resistance 151 connected to the emitter of the transistor 146. The transistor 150 also has a collector resistance 152 which is connected to the positive supply voltage lead 37 and emitter resistance 135 which is connected to the circuit ground. This inverting amplifier stage 15 provides two outputs, a first output generally designated by the reference numeral 154 and is taken from the emitter of the transistor 150 while the second output is generally designated by the reference numeral 155 and is taken at the collector of the transistor 150.

A saw-tooth generator 18 is next provided which has as its main component a storage capacitor 182, one lead of which is connected to the positive supply voltage lead 37 while the other lead of the storage capacitor 182 is connected to the collector of a transistor 180 and the emitter of a switching transistor 181. The transistor 180 is connected to the first output 154 by way of a base resistance 186, while the emitter of the transistor 180 is connected to the circuit ground through an emitter resistance 183. The transistor 180, together with is associated components 186 and 183 serves as a changeable constant current source for slowly charging the storage capacitor 182. The switching transistor 181 is provided with a collector resistance 184 and serves to rapidly discharge the storage condenser 182. The base of the switching transistor 181 is connected with the diode 187 and connected to the circuit ground through a resistance 185. Also connected to the collector of the switching transistor 181 is a coupling capacitor 186.

A second differentiating element 16 is provided as suggested in FIG. 1. Similarly to the differentiator element 12, the element 16 incudes a series connection of a resistance 161, a capacitor 162 and a resistance 163. The resistance 161 is connected with the second pickup coil 113, while the resistance 163 is connected with the circuit ground lead 36. A diode 164 is connected between the junction point of the capacitor 162 and the resistance 163.

A discharging stage 17 is provided for discharging the storage capacitor 182 when an impulse is induced in the pickup coil 113. A transistor 170 functions as the active element, the emitter of which is connected with the circuit ground lead 36. The collector of the transistor 170 is connected to the positive voltage supply lead 37 over a resistance 171. At the same time, the collector of the transistor 170 is connected to the diode 187 by means of a capacitor 174. The base of the transistor 170 is connected to the diode 164 by means of a capacitor 176 and to the positive voltage supply lead over a resistance 172. The base of the transistor 170 is connected to the coupling capacitor 186 by means of a resistance 173. The junction between the capacitor 174 and the diode 187 is connected through the circuit ground lead 36 over a resistance 175. Likewise the junction point between the capacitor 176 and the diode 164 is connected to the circuit ground lead 36 by means of a resistance 177.

An impedance transformer 19 is provided at the output of the discharging stage 17 which consists of a transistor 190 with an emitter resistance 191. The collector of the transistor 190 is directly connected to the positive supply voltage lead 37 while the resistance 191 is connected to the circuit ground lead 36 as shown.

A summing device 22 is provided which consists of five adding resistances 221, 222, 223, 224 and 225. The resistance 221 is connected to the emitter of the transistor 190.

A threshold circuit, here shown as a Schmitt-trigger, follows the summing device 22. The Schmitt-trigger is connected in a well known way and consists of transistors 200 and 201. The emitters of each of the resistances 200 and 201 are connected with one another and are connected to the circuit ground lead 36 through a series circuit consisting of the variable resistance 204 and the Zener diode 205. The collectors of the two transistors 200 and 201 are each connected to the positive voltage supply lead 37 over corresponding collector resistances 202 and 203. The base of the second transistor 201 is connected to the collector of the first transistor 200 and the base of the first transistor 200 is connected to the junction point of the adding resistances 221, 222, 223 and 224. At the output of the threshold circuit 20, here a Schmitt-trigger, a differentiating element is provided which consists of the capacitor 206 and the resistance 207.

A first limiting stage 23 includes the series connection of a resistance 231, trimming potentiometer 232 and the resistance 233. This is a series connection provided between the circuit ground lead 36 and the positive supply voltage lead 37. The tap from the trimming potentiometer 232 is connected to the junction point between the adding resistances 224 and 225 over the diode 234.

Discussing the pressure transducer 25 before the limiting stage 24, the former comprises a transistor 250 which functions as an oscillator in an audion operating circuit configuration. Between the positive supply voltage lead 37 and the circuit ground lead 36 is provided a voltage divider, one part of which consists of the resistance 252 and the other part of which consists of the parallel connection of the adjustable resistance 258 and a negative temperature coefficient (NTC) resistance 257. Between the tap point of this latter voltage divider and the base of the transistor 250 is provided a frequency determining resonant circuit. The resonant circuit comprises a parallel connection of the capacitor 255 and the primary winding of a feedback coupling transformer 256. The collector of the transistor 250 is connected to the positive supply voltage lead 37 over the secondary winding of the feedback coupling transformer 256 and a resistance 251. The junction point between the secondary winding and the resistance 251 is connected to the circuit ground lead 36 by means of a smoothing capacitor 254. The latter junction point is also connected to the first input of the second limiting stage 24 by means of the resistance 253. To change the feedback coupling and thereby to change the output voltage of the oscillator, a damping element 27 is utilized, which, for example, can consist of a copper sheet or disk which is so built or designed that it can be inserted between the primary and the secondary windings of the feedback coupling transformer 256. Such a damping component 27 can be mechanically connected to the throttle linkage of the combustion engine, this then providing a measure of the suction or partial pressure which exists in the intake manifold of the engine.

Now turning to the second limiting stage 24, the series connection of an adjustable resistance 245, and a diode 246 is connected between the first output 154 of the converting amplifier 15 and the output 253 of the pressure transducer 25. In a similar manner, a series connection of the adjustable resistance 243 and the diode 244 is connected between the second output 255, inverting amplifier 15 and the output 253 of the pressure transducer 25. The junction point between the first series connection, namely that of the resistance 245 and the diode 246, is connected to the positive supply voltage lead 37 via the resistance 247. The junction point between the resistance 243 and the diode 244 is connected to the positive supply voltage lead 37 by way of an adjustable resistance 242 and a resistance 241.

In the switching amplifier 21 is a driving or power transistor 211 which has in its collector circuit a collector resistance 216 and the primary winding of the ignition coil. The secondary winding 218 of the ignition coil is connectable through the distributor 28 through the individual spark plugs 29. The power transistor 211 has its base-emitter terminals connected across the resistance 213 as shown. The resistance 213 is the collector resistance of the transistor 212. The base of the transistor 212 is connected to the positive pole of the battery 30 over the resistance 214. The base of the transistor 212 is also connected by means of a diode 215 to the differentiating element consisting of the capacitor 206 and the resistance 207. The switching amplifier 21 is provided with current from the battery 30 over an ignition switch 31 and a fuse 32. Between the fuse 32 and the positive supply voltage lead 37 a series resistance 33 is provided. To stabilize and smoothen the supply voltage for all stages as well as the switching amplifier, a Zener diode 35 and a smoothing capacitor 34 are connected between the positive supply voltage lead 37 and the circuit ground potential lead 36.

Figure 3:
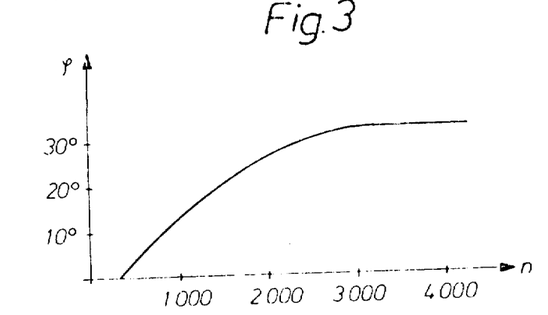
FIG. 3 is a diagram showing the relationship between the pre-ignition or spark-advance timing and the speed of the crankshaft.
Figure 4:
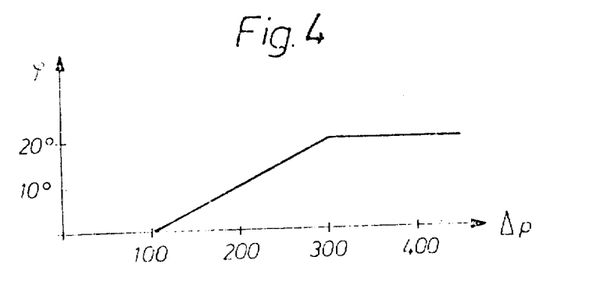
FIG. 4 is a diagram showing the relationship between the pre-ignition or spark advance and the intake manifold pressure.

The diagram shown in FIG. 3 shows the relationship of the pre-ignition $\phi$ as a function of the speed $n$. The pre-ignition $\phi$ is shown in degrees of crankshaft angle and the speed $n$ is in rotations or revolutions per minute. In a similar way FIG. 4 shows the relationship between the pre-ignition $\phi$ as a function of the suction or partial vacuum in the intake manifold $\Delta p$ This intake manifold suction or pressure $\Delta p$ is in mm/Hg head.

Figure 5:
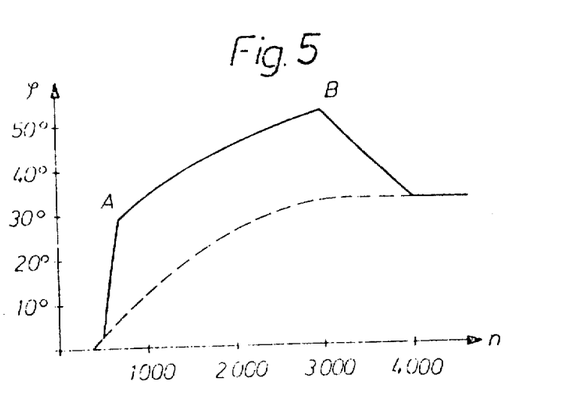
FIG. 5 is a diagram showing the relationship of the pre-ignition or spark advance as a function of speed of the crankshaft both at partial load and at full load.

The diagram in FIG. 5 shows the relationship of the pre-ignition $\phi$ and the speed of the combustion engine. The dashed curve designates the characteristic line for full load or open throttle valve. The solid line shows the pre-ignition angle as a function of speed in part load or by partially closed throttle valve. Depending on the opening of the throttle valve, a multitude of curves can be drawn between these two extreme curves. For each throttle valve opening, a curve intermediate to the solid and dashed curves and running substantially parallel thereto defines the relationship between the pre-ignition angle $\phi$ and the speed $n$ of the crankshaft. The present invention simulates or reproduces these various curves shown in FIG. 5 by the use of electronic circuitry. As described earlier, such curves can be simulated by mechanically controlled ignition systems. These mechanical systems utilize three-dimensional space cams. In such systems, centrifugal force regulators are utilized to consider the speed of the crankshaft while the pressure transducer is utilized to a consideration of the loading of the engine or, the suction in the combustion engine due to variations in the throttle opening.

The opening of the circuit will now be described in relation to the FIGS. 2 to 5. When the disk 10 rotates in response to rotation of the crankshaft (not shown) the teeth 11 made from permanent magnets, induce voltage impulses in both the pickup coils 112 and 113. As described, for every revolution of the disk 110 twelve impulses will be induced in the three series connected coils 112. The voltage impulses induced in the coils 112 are fed into the differentiating circuit 12 where the pulses are differentiated. This generally involves peaking the induced impulses to provide sharp or fast rising pulses. The output of the differentiating circuit is fed into the input of the monostable multivibrator 13. The purpose for differentiating the induced impulses is to insure that the input pulses to the monostable multivibrator 13 have rise times which are sufficiently fast to insure reliable triggering of the monostable multivibrator. For each impulse which triggers the monostable multivibrator 13, the latter generates an output impulse which has a constant width. The operation of the monostable multivibrator 13 is well known and need not be described here. As a result of the generation of the constant width pulses the ratio of the pulse duration to the duration of the period of the output impulses of the monostable multivibrator 13 becomes proportional to the speed of the combustion engine. By making the duration of the pulses generated by the monostable multivibrator 13 of constant width, this not only results in the above described ratio, but it also insures that the ratio remains constant independently of the specific wave forms of the induced voltage pulses generated in the pickup coils 112. The constant width pulses generated by the monostable multivibrator 13 represents an average DC value of current, together with high frequency components. The constant width pulses are then applied to the first and second low pass filters 14a and 14b, respectively. The two low pass filters, capable of passing the direct current components of the pulses produce at their outputs voltage levels which are substantially proportional to the speed of the crankshaft. However, since the first low pass filter 140, 141 exhibits a lower cut-off frequency, it has associated with it a longer time constant since it attenuates frequency components above the cut-off frequency. Accordingly, the output of the first low pass filter generally exhibits smaller ripple superimposed on the output voltage. Since the second low pass filter has a higher cut-off frequency than the first low pass filter, the second low pass filter can respond more quickly to changes in speed with less time delay than the first low pass filter can. The second low pass filter 142, 143 has the higher cut-off frequency and therefore generally produces higher ripple at the output than does the first low pass filter. The diode 144, 145 are connected back-to-back between the two outputs of the respective low pass filters. The diodes exhibit a threshold voltage in the forward conduction direction. Under uniform or constant speed conditions, the output voltage of the first low pass filter 140, 141 having the smaller ripple is applied to the base of the transistor 146. However, for fast speed changes it is important that the ignition circuit respond at speeds greater than can be afforded by the first low pass filter 140, 141. Thus, when the frequency of the constant width pulses emanating from the monostable multivibrator 13 increases as a result of the increase in the speed of the crankshaft, the voltages across the capacitors 141 and 143 start to charge to the new value of DC voltage which represents the DC component of the resulting pulses. However, as described above, the time constant of the first low pass filter 140, 141 is slower than the time constant of the second low pass filter 142, 143. Accordingly, the capacitor 143 will charge up faster than the capacitor 141 will. When the voltage across the capacitor 143 has exceeded the voltage across the capacitor 141 and an additional value which represents the threshold voltage or voltage drop across the diodes, the diode 145 becomes conductive to thereby apply the higher voltage to the base of the transistor 146. However, after the capacitor 141 is charged to the same value as that across the capacitor 143, the diodes 144, 145 again become non-conductive for the reason that their threshold voltage is not exceeded. Thus, the diodes 144, 145 have a tendency to equalize the outputs of the two low pass filters while permitting rapid changes to be transmitted. As described, the voltage appearing across the capacitor 143 has a higher ripple than that appearing across the capacitor 141. However, in order to reduce the reaction time of the circuit, it is deemed acceptable to apply a voltage to the base of the transistor 146 which has slightly higher ripple for short periods of time. As described, as soon as the two low pass filters have the opportunity to equalize their respective outputs, the second low pass filter with the higher ripple is effectively cut out of the circuit to thereby provide to the base of the transistor 146 a voltage which is essentially direct and has very small ripple.

The output of the low pass filter arrangement is connected to the base of the transistor 180 over two emitter follower stages which are designated by the transistors 146 and 150. The transistor 180 functions as a constant current source for the purpose of slowly charging the storage capacitor 182. The charging current for the capacitor 182 is therefore also related to the speed of the crankshaft. Namely, the higher the speed of the crankshaft, the higher will be the constant charging current. As can be readily seen, as the speed of the crankshaft increases, the DC voltage appearing at the base of the transistor 146, increases. An increase in the DC voltage at the base of the transistor 146, increases. An increase in the DC voltage at the base of the transistor 146 causes this transistor to become more forward biassed, this increasing the collector-emitter current flowing through the transistor 146 and the resistance 147. This in turn causes the voltage at the emitter of the transistor 146 to become more positive, this more positive voltage being applied to the base of the transistor 150 by way of the resistance 151. As in the previous stage such an increase in voltage at the base of the transistor 150 causes the collector-emitter current in such transistor to increase. Such current increase increases the voltage at the output 154 which is then transmitted to the base of the transistor 180. Since the direct voltages at the base of the transistor 146 are substantially proportional to the speed of the engine, the current flowing through the collector-base junction of the transistor 180 will likewise be proportional to the speed of the engine since the two intermediate stages are emitter-followers. According to principles well known, changes in the magnitude of a constant current which charges a storage capacitor, changes the slope of the linear wave-form which is formed across the storage capacitor. Since the magnitude of the constant current is a function of the speed of the crankshaft, the slope of the linear wave-form formed across the capacitor 182 likewise becomes proportional to the speed of the engine. Switching this function of time, a saw-tooth wave-form is formed which has a leading edge having a slope determined by the slow charging of the capacitor 184 by the constant current source transistor 180. The trailing edge of the saw-tooth wave-form is produced by the discharging of the storage capacitor 182. This is accomplished by utilizing a switching transistor 181 which discharges the storage capacitor 182 each time that a tooth 111 passes the second induction coil 113. When a voltage impulse is induced in the pickup coil 113, this induced pulse is differentiated in the differentiating circuit 16. As in the case of the differentiating circuit 12, this merely serves to sharpen the pulse to insure reliable triggering. Thus, when a pulse appears at the output of the pickup coil 113 the differentiated pulse coming from the differentiating element 16 turns off the normally conducting transistor 170 by means of the capacitor 176. The transistor 170 comprises the active element in the discharging stage 17. Once the transistor 170 becomes non-conductive, its collector voltage rapidly rises in a positive direction. This positive step in the collector of the transistor 170 is transmitted by means of the capacitor 174, the diode 187, to the base of the switching transistor 181. The application of the positive step voltage to the base of the transistor 181 places this transistor into a heavily conducting state, this discharging the storage condenser 182. The discharge time constant is selected so that the trailing edge of the saw-tooth wave-form is much shorter in time relative to the time duration of the leading edge. By so forming the leading and the trailing edges, a saw-tooth wave-form is generated at the collector of the transistor 180 in response to continuous rotation of the disk 110. To further insure fast switching of the switching transistor 181, a capacitive feedback coupling is provided which connects the collector of the switching transistor 181 to the base of the transistor 170 over a series circuit consisting of the capacitor 186 and the resistance 173. The saw-tooth wave-form appearing at the collector of the transistor 180 is transmitted to the Schmitt-trigger circuit 20 over the impedance transformer 19 and the adding resistance 221.

The Schmitt-trigger flips when the leading edge of the saw-toooth impulse achieves a predetermined voltage value in one direction and another such value of the trailing edge in the other direction. Such operation of Schmitt-triggers is well known and need not be further described. The switching amplifier 21 is so designed that the power transistor 211 is turned off when the Schmitt-trigger flips in one direction during the leading edge of the saw-tooth wave. In this manner, the ignition is activated.

The stages described thus far, namely the stages 11 through 21, insure that the ignition is independent of the speed of the crankshaft by maintaining substantially equal crankshaft angles with the changing speed. This result follows not only because the frequency of the saw-tooth wave is proportional to the speed but also the slope of the leading edges of the saw-tooth wave is likewise proportional to the speed.

When the Schmitt-trigger 20 exhibits a constant switching threshold, the level the ignition spark advance remains substantially constant irrespective of the speed of the crankshaft. In this case, the reference level on which the saw-tooth wave-form is superimposed remains fixed in relation to the threshold level of the Schmitt-trigger. Because both the frequency of the saw-tooth wave-form as well as the slope of the leading edges of the saw-tooth wave-form both change and are both proportional to the speed of the crankshaft, the firing time relative to the position of the crankshaft will remain constant. However, the ignition time adjustment or the spark advance adjustment can be achieved if the reference level of the saw-tooth wave-form is changed relative to the switching threshold of the Schmitt-trigger. This may be accomplished by changing the switching threshold of the Schmitt-trigger or by passing the saw-tooth wave-form to the Schmitt-trigger through a variable voltage divider. The presently preferred embodiment shown in FIG. 2, the second alternative is selected. Thus, the base of the transistor 200 is connected with the circuit ground potential lead 36 through a resistance 222. Positive input voltages are provided over the adding resistances 221, 223, 224 and 225.

As will become clear, the presently preferred embodiment makes it possible to correct the ignition timing curves either as a function of speed, as a function of the internal manifold pressure, or as a function of both. For pure speed correction, that is the adjustment of the ignition timing as a function of the speed, the circuit operates as follows: a voltage is tapped off from the collector of the transistor 150 in the inverting amplifier 15. The voltage at the second output point 115 becomes more negative with increasing speed. As explained above, with increasing speed the input voltage to the base of the transistor 150 becomes more positive this making the transistor 152 more conductive. An increase in current through the collector of the transistor 150 causes the voltage at the collector to become less positive.

The voltage at the collector of the transistor 150 is applied to the base of the transistor 200 over the adding resistors 224, 225. The leading edge of a saw-tooth impulse begins approximately by the potential of the positive supply voltage lead 37 and changes linearly towards the negative values approaching the voltage appearing at the circuit ground potential lead 36. By increasing the DC level at the base of the transistor 200, it effectively changes the relationship between the reference voltage of the saw-tooth wave-form and the threshold level of the Schmitt-trigger. Effectively, the threshold level of the Schmitt trigger circuit is modified. Thus, when the speed of the crankshaft increases, the voltages at the second output 155 as well as the voltage at the base of the transistor 200 decrease. The threshold level of the Schmitt-trigger effectively increases relative to the position of the saw-tooth waveform or the saw-tooth wave-form decreases relative to the position of the Schmitt-trigger threshold level. This results in an earlier ignition timing in reference to the crankshaft angle. Thus, the increase in the speed of the crankshaft produces an advance of the ignition timing as shown in FIG. 3. However, as FIG. 3 indicates, the advance in the ignition should not continue to increase for all values of crankshaft speeds. Beyond approximately 3,000 R.P.M. the spark advance angle should no longer increase but remain constant. The first limiting stage 23 is provided for the purpose of leveling out the characteristic curve as shown in FIG. 3. The first limiting stage 23 limits the negative voltage which can be supplied to the base of the transistor 200 by means of the resistances 224, 225. Specifically, the limiting is aided with the diode 234 which becomes conductive when the voltage at the junction of the resistances 224, 225 becomes too negative. It is clear that the adjustment of the resistance 232 can be used to set the point or negative voltage at which the diode 234 becomes conductive. In this manner, the limiting or the changes in DC level at the base of the transistor 200 can be adjusted to correspond to any desired speed.

As just described, the use of the first limiting stage 23 and the resistances 224, 225, the function of the known mechanical ignition centrifugal speed adjusters has been simulated electronically. To simulate or reproduce the function of the pressure transducer adjusters, a second limiting stage 24 as well as a pressure transducer 25 is utilized. The pressure transducer 25 consists of an oscillator in the audion circuit configuration. The transistor 250 also operates simultaneously as an amplifier as well as a rectifier, so that a DC voltage appears across the capacitor 254, the magnitude of this DC voltage being proportional to the feedback factor in the oscillating circuit.

The feedback factor of the oscillator is varied by means of a damping element 27, the damping element being so arranged that the higher the intake manifold suction, the further the damping element is inserted into the air gap of a feedback coupling transformer 256. Thus, with increasing suction in the intake manifold, the damping element 27 decreases the feedback coupling in the transformer 256 and the amplitude of the oscillation signal as well as the DC voltage across the capacitor 254 decreases.

The voltage across the capacitor 254 is transmitted to the base of the transistor 200 by means of the resistances 254 and 223. This voltage, as the voltage at the second output 155 of the inverting amplifier 15, becomes more negative with increasing suction in the intake manifold or with lesser loads. Without the second limiting stage 24, the spark advance changes which would be brought about by the pressure transducer 25 would be to continually increase the spark advance with increasing intake manifold suction. However, as illustrated in FIG. 5, such increases must be limited at the points A and B, that is at low and high speeds.

The limiting is accomplished as in the first limiting stage 23 by diodes 244 and 246. The comparison voltage for the limiting at the low (A) and by the high (B) speeds are taken from the two outputs of the inverting amplifier 15. The level at the first output 154 increases with increasing speeds, while the level at the second output 155 decrease with increasing speeds of the crankshaft. Thus, at speeds lower than the boundary speed designated by A in FIG. 5, the voltage at the second output 155 is substantially positive and sufficient to place the diode 244 in forward conduction. In this state, it is not possible for the pressure transistor 25 to apply a negative voltage to the base of the transistor 200. On the other hand, at very high speeds, the first output 154 presents a similarly high positive voltage. Such high positive voltage places the diode 246 in forward conduction, this again preventing the pressure transducer 225 from applying a negative going voltage to the base of the transistor 200. However, at intermediate speeds, when the levels at the output 154 and 155 are not sufficient in themselves to cause the diodes 244 and 246 to be conducting, this permits the negative voltages at the output of the resistance 253 to be applied to the base of the transistor 200 to thereby increase the spark advance angle in a similar manner as described above. The various thresholds for the individual limiting stages can be changed by adjusting the resistances 222, 225 and 232. In this manner it is possible to adjust the characteristic curve for ignition systems within wide limits and to vary the curve for different types of internal combustion engines.

Although the active elements in the saw-tooth generator, the Schmitt-trigger and the limiting stages have been described as being transistors, this is not limiting to the present invention but merely illustrative. With equal simplicity, it is possible to utilize thyristors or any other suitable active component. Also, any other suitable arrangement for providing a source of constant DC current for charging the storage condenser can be utilized, the specific circuit as shown for this purpose again being merely illustrative. Similarly, the impulse generator has been described as utilizing pickup coils and permanent magnet teeth. Instead, any other suitable arrangement for monitoring the position of the crankshaft is possible. Thus, for example, an optoelectronic system which utilizes photocells or phototransistors can be equally suitable.

With the above described invention, the ignition system provides for the aforementioned requirements for such a system. The characteristic curve according to FIG. 5 is simulated not only in one portion thereof but over the entire anticipated range of speeds, as well as load. The circuit makes use of simple circuitry without complicated timing elements with variable time constant. Additionally, the present invention utilizes common functional circuits which makes it possible and convenient to construct the circuit by means of integrated building blocks, this further simplifying the construction and decreasing the cost of building such circuits.

It will be understood that each of the elements described above, or two or more together may also a useful application in other types of control circuits differing from the types described above.

While the invention has been illustrated and described as embodied in an ignition system for internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In an ignition system for an internal combustion engine having a crankshaft, ignition timing arrangement comprising generating means comprising a saw-tooth generator for generating saw-tooth pulses having leading edges, the slope of said leading edges and the frequency of said pulses being a function of engine speed, with said leading edges fluctuating between first and second levels, said saw-tooth generator comprising a storage capacitor, constant current means for slowly charging said storage capacitor, switching means for rapidly discharging said capacitor, electrical impulse generator means for generating pulses in synchronism with the position of said crankshaft, monostable miltivibrator means for generating uniform pulses in response to the generation of said impulses by said impulse generator means, first and second low-pass filters, said first low pass filter having a lower cut-off frequency than said second low-pass filter, the inputs to said filters being connected to said multivibrator means for receiving said uniform pulses, and the outputs of said low-pass filters being connected to said constant current means for regulating the magnitude of said constant current, and equalizing means connected between the respective outputs of said first and second low-pass filters for equalizing the levels of the voltages at the corresponding outputs of the latter; and detecting means for detecting the magnitude of said leading edges and generating an ignition signal when the magnitude of the leading edges of said pulses reaches a predetermined level.

2. In an ignition system as defined in claim 1, wherein said generating means further comprises an impedance transformer provided between said first low pass filter and said constant current means.

3. In an ignition system as defined in claim 2, wherein said generating means further comprises an inverting amplifier provided between said low pass filters and said saw-tooth generator, said inverting amplifier having first and second outputs, the DC voltage level at said first output increasing with increasing speed, the DC voltage level at said second output decreasing with increasing speed, said saw-tooth generator being connected to said first output.

4. In an ignition system as defined in claim 3, wherein said detecting means comprising a threshold circuit arranged to detect said predetermined level; a summing device having a plurality of inputs and at least one output, said one output being connected to said threshold circuit, and one input being connected to said saw-tooth generator.

5. In an ignition system as defined in claim 4, wherein another input of said summing device is connected to said second output of said inverting amplifier.

6. In an ignition system as defined in claim 5, said detecting means further comprising an impedance transformer provided between said saw-tooth generator and said summing device.

7. In an ignition system as defined in claim 5, said detecting means further comprising a limiting stage provided between said second output of said inverting amplifier and said other summing device input.

8. In an ignition system as defined in claim 3, wherein said detecting means further comprises a pressure transducer means for sensing the intake manifold pressure, said latter means being connected to a third input of said summing device.

9. In an ignition system as defined in claim 8, wherein said detecting means further comprises a limiting stage provided between said pressure transducer means and said summing device.

10. In an ignition system as defined in claim 8, wherein said pressure transducer means comprises an oscillator having inductive feedback coupling; and a damping element mechanically actuated by the position of the engine throttle for modifying said coupling.

11. In an ignition system as defined in claim 10, wherein said oscillator is in the audion circuit configuration.

* * * * *

UNITED STATES PATENT OFFICE
CERTIFICATE OF CORRECTION

Patent No. 3,811,420     Dated May 21, 1974

Inventor(s) Wilhelm Vogel

It is certified that error appears in the above-identified patent and that said Letters Patent are hereby corrected as shown below:

The drawing sheets attached hereto, showing Figs. 2-5, form part of the drawings of this patent.

Signed and sealed this 31st day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,811,420  Dated May 21, 1974

Inventor(s) Wilhelm Vogel

It is certified that error appears in the above-identified patent and that said Letters Patent are hereby corrected as shown below:

The drawing sheets attached hereto, showing Figs. 2-5, form part of the drawings of this patent.

This certificate supersedes Certificates of Correction issued December 31, 1974.

Signed and Sealed this

Twenty-seventh Day of July 1976

[SEAL]

Attest:

RUTH C. MASON
Attesting Officer

C. MARSHALL DANN
Commissioner of Patents and Trademarks